United States Patent [19]

Hart

[11] Patent Number: 4,932,700
[45] Date of Patent: Jun. 12, 1990

[54] MOORING LINE SHACKLE

[76] Inventor: Ronald D. Hart, 4041 Ruston Way, Suite 2-A, Tacoma, Wash. 98402

[21] Appl. No.: 298,623

[22] Filed: Jan. 18, 1989

[51] Int. Cl.[5] .......................... B25J 1/00; B63B 21/54
[52] U.S. Cl. .................................. 294/19.1; 24/600.7; 114/221 R
[58] Field of Search ................. 294/19.1, 82.24, 82.27, 294/82.35; 24/238, 239, 241 S, 241 SL; 114/114, 221 R, 230

[56] References Cited

U.S. PATENT DOCUMENTS

| 741,014 | 10/1903 | Covert | 24/241 SL |
|---|---|---|---|
| 2,116,880 | 5/1938 | Dee | 294/19.1 |
| 3,273,928 | 9/1966 | Wisniewski | 294/19.1 X |
| 3,584,351 | 6/1971 | Sliwinski | 24/239 |
| 3,646,645 | 3/1972 | Bauer | 24/241 SL |
| 3,811,158 | 5/1974 | Merser | 24/239 |
| 4,075,966 | 2/1978 | Bates et al. | 24/239 X |
| 4,595,223 | 6/1986 | Hawie | 294/19.1 |

FOREIGN PATENT DOCUMENTS

| 950654 | 8/1982 | U.S.S.R. | 294/82.35 |
|---|---|---|---|
| 984973 | 1/1983 | U.S.S.R. | 294/82.35 |

Primary Examiner—Johnny D. Cherry
Attorney, Agent, or Firm—Nies, Kurz, Bergert & Tamburro

[57] ABSTRACT

A remotely operable shackle particularly adapted for connecting a mooring line to a mooring loop. The shackle may be detachably carried by a boat hook and is remotely operable to connect and disconnect the shackle from a mooring loop.

3 Claims, 2 Drawing Sheets

U.S. Patent Jun. 12, 1990 Sheet 2 of 2 4,932,700
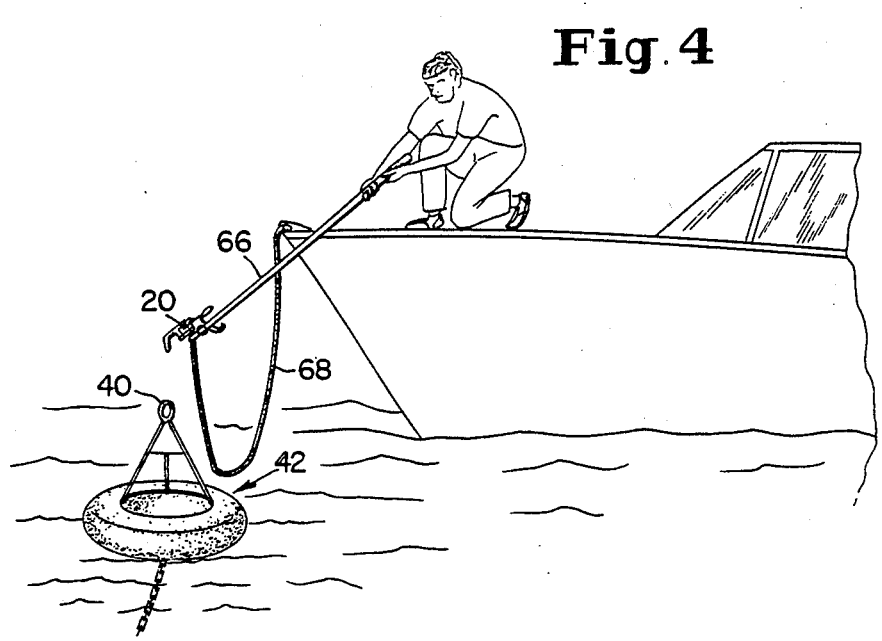
Fig. 4
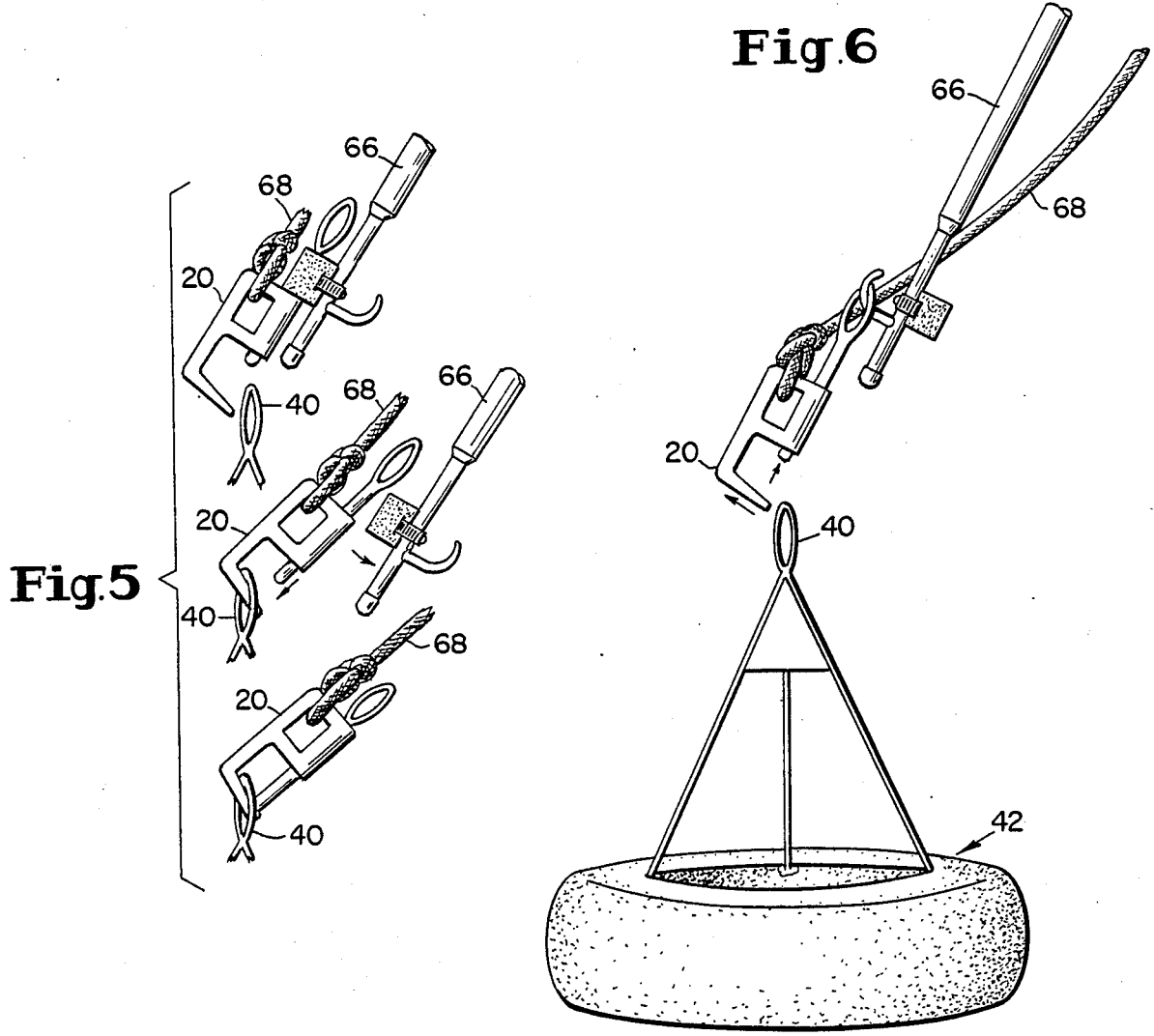
Fig. 5
Fig. 6

MOORING LINE SHACKLE

BACKGROUND OF THE INVENTION

This invention relates to a shackle and more particularly to a shackle for connecting and disconnecting a mooring line to a mooring buoy or the like.

In the operation of small boats, it is frequently necessary to moor the boat away from the dock usually by attaching a mooring line to a buoy having a mooring ring. Since the ring carried by the buoy may be several feed beyond the reach of the boat operator, considerable difficulty is often encountered in securing the clip on the end of a mooring line to the mooring buoy and in inclement weather a certain degree of danger may be involved. Similar difficulties are encountered in disengaging the mooring line and in rough weather the difficulties may be sufficient to require the cutting of the mooring line rather than the disengagement of the line from the buoy.

Despire these difficulties and attendant occasional hazzards, it is the general practice to attach a clip on the end of a mooring line to the ring of a mooring buoy by manually bringing the parts together. Alternately, the mooring line may be threaded through the loop on the mooring buoy and secured with a knot. In either case the actions required are awkward, difficult and occasionally dangerous.

It is believed that prior to the present invention it has not been proposed to use remotely operated shackles to facilitate the engagement of the mooring line and the mooring buoy. This, despire the availability, in the prior art of remotely operable locking shackles. An example of such a shackle is disclosed in Pat. 3,646,645. This device however is a relatively complex expensive construction and clearly not suitable for service in a marine environment.

With the foregoing considerations in mind, it is the principal purpose and object of the invention to provide an improved remotely operated shackle which overcomes the difficulties with prior constructions described above and eliminates the awkwardness and danger associated with connecting and disconnecting a mooring line from a mooring line buoy.

In attaining this and other objects the present invention provides an improved shackle which includes a hook portion having a wide mouth to facilitate its placement over and around a mooring ring and a remotely actuatable shackle pin to close the opening to retain the ring within the hook portion of the shackle. During engagement of the shackle with the mooring ring, the pin is normally held in the open position by a blocking member frictionally held on the pin, the blocking member being moutable on the end of the a boat hook so that the shackle in its entirety may be thus detachably secured on the boat hook. The locking operation is completed by pulling the blocking member away from the shackle. When the blocking member is removed, the pin snaps to closed position.

The shackle is released from the mooring ring by pulling the shackle pin away from its closed position by a boat hook or similar implement permitting the shackle to slide off the mooring hook.

Additional objects and advantages will become apparent as the description proceeds in connection with the accompanying drawings in which:

FIG. 4 is a pictorial view showing a user manipulating the shackle into engaging position;

FIG. 5 shows various steps followed during the engagement procedure; and

FIG. 6 shows the shackle immediately following disengagement from the mooring ring.

Figure 1:
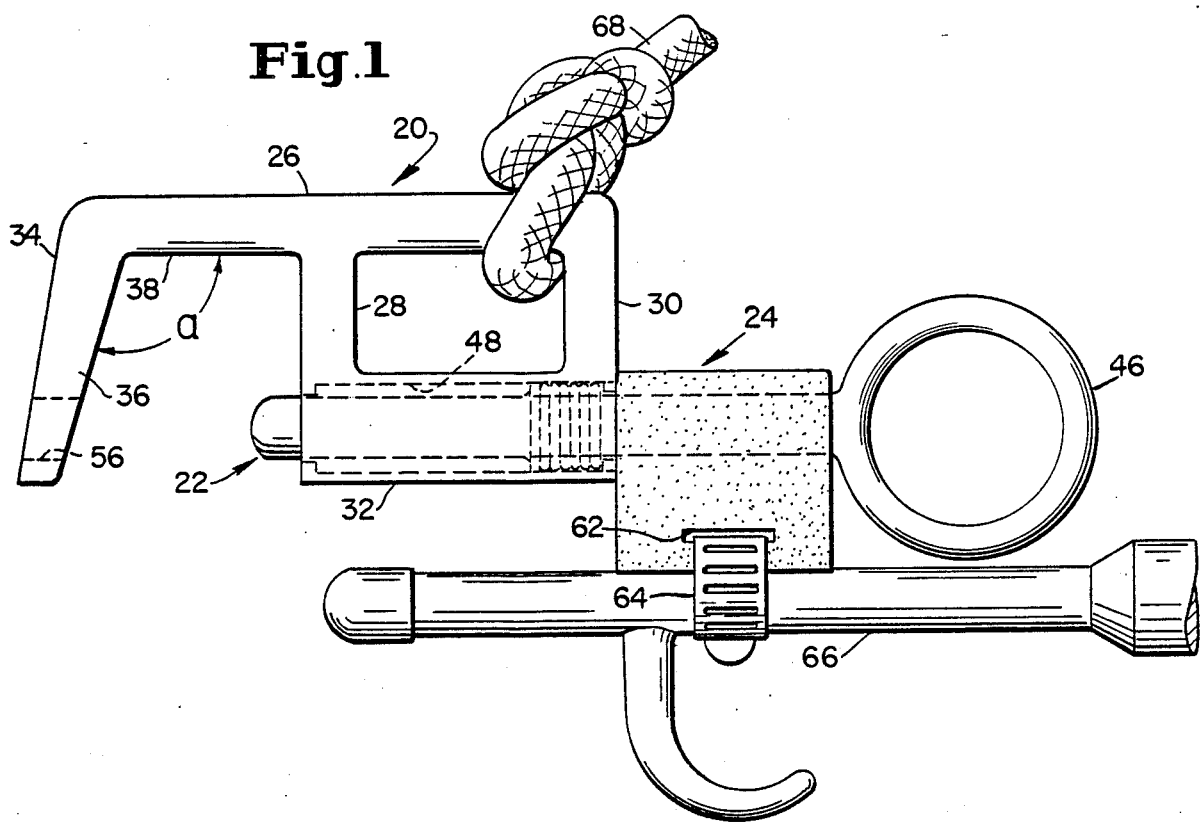
FIG. 1 is a side elevation of a shackle constructed in accordance with the present invention shown in open position and mounted on the end of a boat hook.

Referring now more particularly to the drawings, it is a feature of the shackle that it is of uncomplicated, inexpensive construction. In a preferred form it comprises essentially three components, a main body member 20, a shackle pin 22, and a blocking member 24. The body member comprises essentially a one piece frame construction including a base section 26, and a pair of arms 28 and 30 connecting the base section with a cylindrical shackle pin supporting section 32. Formed integrally with one end of the base section 26 is a hook arm 34, the interior surface 36 of which is inclined at an angle a which is larger than 90°, for example 105°, with respect to the surface 38 of the base section 26.

Thus, the hook support 34 with the base section 26 and the arm 28 form an open portion for the reception of a typical loop 40 provided on a mooring buoy indicated generally at 42. The angular relation between the surfaces 36 and 38 facilitates engagement and disengagement of the ring 40.

Figure 2:
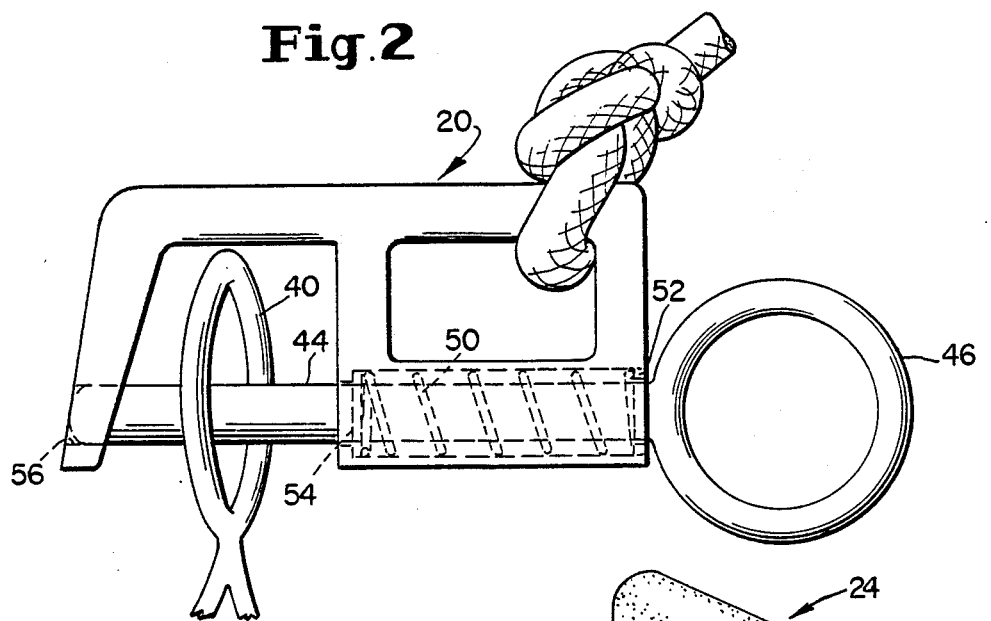
FIG. 2 is a side elevation of a shackle shown in closed position after removal from the boat hook.
Figure 3:
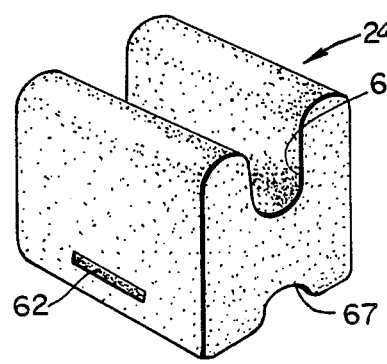
FIG. 3 is an isometric view of a blocking member removed from the shackle.

The shackle pin 22 preferably has a cylindrical main body section 44 and is provided at one end with a ring 46. The shackle pin is mounted for sliding movement in a bore 48 formed in the cylindrical section 32 and is biased toward closed position as shown in FIG. 2 by a spring 50 compressed between a ring 52, secured by peening or other suitable means in the end of the bore 48, and shoulder 54 formed on the shackle pin. The shackle pin is so dimensioned that when it is fully withdrawn it substantially clears the hook portion of the shackle and, when closed as shown in FIG. 2, extends into an opening 56 formed in the arm 34.

The blocking member 24 is provided to selectively hold the shackle pin in its fully withdrawn position. The blocking member 24 is preferably formed from a plastic material such as DELRIN and is provided in its upper surface with a groove 60, the side arms of which frictionally engage the cylindrical body portion of the shackle pin 22. The blocking member is also provided with a through opening 62 to accommodate a flexible strap 64 for attachment to a boat hook 66 as shown in FIG. 1. Preferably the blocking member is provided in its lower surface with an appropriate recess 67 to conform to the contour of the adjacent portion of the boat hook.

To ready the shackle for use, one end of the mooring line is secured to the boat, the other end of the mooring line 68 having been previously secured to the shackle as shown in FIGS. 1 and 2, the blocking member 24 is secured to the boat hook 66 and the shackle pin is withdrawn and snapped into the blocking member so that the parts occupy the position shown in FIG. 1. The boat hook, carrying the shackle assembly and the mooring line is then advanced toward the mooring buoy as shown in FIG. 4. When the assembly reaches the position of the mid illustration of FIG. 5, the boat hook and the blocking member 24 are pulled away from the shackle assembly permitting the pin to snap to close position as shown in the bottom portion of FIG. 5 so that the mooring line is firmly and securely attached to the mooring buoy.

The shackle may be quickly and easily released by engaging the boat hook with the ring 46. A straight pulling motion will retract the shackle pin to permit the shackle to slide off the mooring ring 40, this action being facilitated by the inclination of the surface 36.

While the shackle of the present invention has been described in connection with the attachment of a mooring line to a mooring buoy, it is apparent that the shackle may have other applications in which a line is to be attached to a ring or hook to which access is difficult.

I claim:

1. A shackle for selectively connecting a mooring line to a mooring loop comprising a main body member adapted to be connected to said mooring line, said main body member having a loop engaging section open at one side, a shackle pin carried by said body member for movement between an advanced position closing said open side and a retracted position permitting access to said open side, said shackle pin being spring biased to said advanced position, said shackle pin having a portion projecting externally of said main body member and terminating in its outer end in an enlarged connector portion, and a blocking member adapted to be detachably mounted on said projecting portion of said shackle pin externally of said body member between said body member and said enlarged connector portion for preventing movement of said shackle pin to said advanced position whereby said shackle may be secured to said mooring loop by removing said blocking member after said loop is positioned in said loop engaging section.

2. The shackle according to claim 1 wherein said blocking member is adapted to be carried by a manipulating member whereby when said blocking member is attached to said shackle pin, said shackle is carried by said manipulating member.

3. A shackle according to claim 1 wherein said enlarged connector portion of said shackle pin is in the form of a loop to facilitate movement of said shackle pin by a hook or like instrument away from said advanced position to permit release of said mooring loop.

* * * * *